(12) United States Patent
Py

(10) Patent No.: US 8,646,243 B2
(45) Date of Patent: Feb. 11, 2014

(54) APPARATUS FOR FORMULATING AND ASEPTICALLY FILLING LIQUID PRODUCTS

(75) Inventor: Daniel Py, Larchmont, NY (US)

(73) Assignee: Medical Instill Technologies, Inc., New Milford, CT (US)

( * ) Notice: Subject to any disclaimer, the term of this patent is extended or adjusted under 35 U.S.C. 154(b) by 630 days.

(21) Appl. No.: 12/245,678

(22) Filed: Oct. 3, 2008

(65) Prior Publication Data

US 2009/0094940 A1   Apr. 16, 2009

Related U.S. Application Data

(60) Provisional application No. 60/997,675, filed on Oct. 4, 2007.

(51) Int. Cl.
*B65B 1/00* (2006.01)
(52) U.S. Cl.
USPC .................................. 53/284; 53/282; 53/167
(58) Field of Classification Search
USPC ............. 53/284, 282, 284.5, 284.6, 167, 425, 53/426; 426/399, 665, 392, 397
See application file for complete search history.

(56) References Cited

U.S. PATENT DOCUMENTS

| | | | |
|---|---|---|---|
| 1,809,432 A | 6/1931 | Webb | |
| 2,639,991 A | 5/1953 | Ball | |
| 2,813,531 A | 11/1957 | Lee | |
| 3,214,338 A | 10/1965 | Ehrlich | |
| 3,573,067 A | 3/1971 | Shultz | |
| 3,783,581 A * | 1/1974 | Pierce | 53/426 |
| 3,899,862 A * | 8/1975 | Muys et al. | 53/426 |

(Continued)

FOREIGN PATENT DOCUMENTS

WO    WO 94/12062 A1    6/1994

OTHER PUBLICATIONS

International Search Report and Written Opinion of the International Searching Authority for International Application No. PCT/US2008/78862.

(Continued)

*Primary Examiner* — Sameh H. Tawfik
(74) *Attorney, Agent, or Firm* — McCarter & English, LLP

(57) ABSTRACT

An apparatus and method are provided for formulating and aseptically filling liquid products. A first liquid source includes at least one first liquid component; a second liquid source includes at least one second liquid component; and a container includes a body defining an empty, sterile storage chamber therein that is sealed with respect to ambient atmosphere. The container is introduced into a sterile filling chamber. A first filling member coupled in fluid communication with the first liquid source is placed in fluid communication with the storage chamber of the container located in the sterile filling chamber, and the first liquid component is aseptically introduced through the first filling member and into the storage chamber. A second filling member coupled in fluid communication with the second liquid source is placed in fluid communication with the storage chamber of the container located in the sterile filling chamber, and the second liquid component is aseptically introduced through the second filling member and into the storage chamber and, in turn, the first and second liquid components are combined into a liquid product formulation within the sterile chamber of the container. The first and second filling members are withdrawn from fluid communication with the storage chamber of the container located within the sterile filling chamber, and the filled storage chamber is sealed with respect to ambient atmosphere to hermetically seal the liquid product formulation within the storage chamber of the container.

23 Claims, 2 Drawing Sheets

(56) References Cited

U.S. PATENT DOCUMENTS

| | | | |
|---|---|---|---|
| 4,118,778 A | | 10/1978 | Strub |
| 4,417,607 A | | 11/1983 | Scholle et al. |
| 4,522,015 A | | 6/1985 | Hildebolt |
| 4,597,242 A | * | 7/1986 | Hendriks et al. ............ 53/426 |
| 4,742,667 A | * | 5/1988 | Muller et al. ............... 53/167 |
| 4,992,247 A | * | 2/1991 | Foti ............................ 422/304 |
| 5,286,512 A | | 2/1994 | Klemann et al. |
| 5,673,535 A | * | 10/1997 | Jagger ........................ 53/282 |
| 5,720,148 A | * | 2/1998 | Bedin et al. ................ 53/167 |
| 5,895,626 A | | 4/1999 | Nakata et al. |
| 5,955,132 A | | 9/1999 | Spica et al. |
| 6,341,472 B1 | | 1/2002 | Schroeder |
| 6,544,568 B2 | | 4/2003 | La Droitte et al. |
| 6,702,985 B1 | | 3/2004 | Taggart et al. |
| 6,855,358 B1 | | 2/2005 | Nickolas et al. |
| 6,929,040 B2 | * | 8/2005 | Py .............................. 141/329 |
| 7,247,320 B2 | | 7/2007 | Jost |
| 7,707,807 B2 | * | 5/2010 | Py ............................... 53/561 |
| 2002/0105856 A1 | | 8/2002 | Terentiev |
| 2002/0172745 A1 | | 11/2002 | Palaniappan |
| 2003/0159750 A1 | | 8/2003 | Py |
| 2003/0171299 A1 | | 9/2003 | Autuori et al. |
| 2004/0166222 A1 | | 8/2004 | Pons Biescas et al. |
| 2004/0226888 A1 | | 11/2004 | Chandarana et al. |
| 2005/0000591 A1 | | 1/2005 | Py et al. |
| 2005/0112177 A1 | | 5/2005 | Dopson et al. |
| 2006/0231519 A1 | | 10/2006 | Py et al. |
| 2007/0000573 A1 | | 1/2007 | Py et al. |
| 2007/1008285 | | 4/2007 | Stover et al. |
| 2008/1002309 | | 1/2008 | Schubert et al. |

OTHER PUBLICATIONS

Supplementary European Search Report for European Application No. EP 08 83 4803.

* cited by examiner

US 8,646,243 B2

APPARATUS FOR FORMULATING AND ASEPTICALLY FILLING LIQUID PRODUCTS

CROSS-REFERENCE TO PRIORITY AND RELATED APPLICATIONS

This patent application claims priority under 35 U.S.C. §119 on prior U.S. provisional patent application Ser. No. 60/997,675, filed Oct. 4, 2007, entitled "Apparatus And Method For Formulating And Aseptically Filling Liquid Products", which is hereby incorporated by reference in its entirety as part of the present disclosure. In addition, this patent application contains subject matter related to the co-pending U.S. patent application filed in the name of the same inventor, on even date herewith, entitled "Method for Formulating and Aseptically Filling Liquid Products."

FIELD OF THE INVENTION

The present invention relates to apparatus for formulating and/or filling products, and more particularly, to apparatus for aseptically formulating and/or filling liquid products.

BACKGROUND INFORMATION

Sterility and shelf-life are important considerations in the manufacture of many liquid food products, such as liquid nutrition products and beverages. Food manufacturing practices must achieve final products with assured microbial safety, e.g., sterility. Traditionally, this means products must be heat processed to reduce any potential microbial contamination to meet or exceed the levels of sterility prescribed for such products in national and international legislation. In addition, products typically must be stored for extended periods of time and hence unstable components cannot be included without deterioration or must be over-dosed to ensure that minimal quantities remain at point of consumption. For many products, such as infant formulas and other liquid nutrition products, it is desirable that the products contain certain essential nutrients, such as all of the essential nutrients needed for human infant growth and development in the case of infant formula.

A prerequisite to an infant formula is that the final product must be microbiologically safe, and for that reason traditional processing mandates that the final product be adequately heat processed. Thus, products in liquid form are subject to a rigorous heat treatment typically by exposure to high temperatures for short time (UHT—aseptic process) or by retorting. The retort sterilization has been recommended for products used in hospitals to feed premature and term newborn babies.

While these thermal treatments can be successful in assuring microbial safety, they can adversely affect the molecular components and structures that are ingredients in infant formulas and other liquid nutrition products. Invariably, heat-treating complex infant formula mixtures leads to various reactions of individual molecules and to interactions between different components. One prior art strategy to resolve the losses caused by these destructive reactions with respect to the final quantities of components of formula is to include a sufficient excess of the ingredients as a quantitative function of the instability to ensure that sufficient levels of essential nutrients remain in the final product. The strategy of using excess nutrients prior to processing the formula ignores the potential implications to the user of consuming thermal reaction products formed during processing. Thus, although necessary, the thermal processing of nutritional components can generate compounds or intermediates that may have undesirable nutritional consequences.

Another drawback of thermal processing is that it can generate advanced glycation end products (AGEs). Through the Maillard reaction, certain amino acids such as lysine can react with aldehyde groups of glucose to first create Schiff bases and then rearrange to Amadori products. These reactions produce various glycoxidation and lipoxidation products which are collectively known as AGEs. AGEs are formed by the Maillard reaction during food processing when, for example, mixtures containing protein and carbohydrates are heated. However, AGEs also may be formed endogenously in the body and are thought to contribute to the natural aging process.

AGEs are end-products that in general retain little chemical reactivity. They are formed via complex chemical reactions which may include oxidation reactions and the formation of reactive intermediates. Thus, AGEs can be considered markers for the formation of these reactive intermediates. These intermediates include glyoxal, methylglyoxal, 3-deoxyglucosone, glyceraldehyde, and others. Examples of AGEs are lactuloselysine, hydroxymethylfurfural, oxalic acid monolysinylamide, and carboxymethyllysine.

It has been suggested that AGEs may be linked to chronic low level inflammation. This is due in part to oxidative stress caused by AGEs. Chronic low level inflammation has been linked to a number of diseases. For example, it is hypothesized that chronic low level inflammation may be linked to diabetes, cardiovascular disease, Alzheimer, cancer, and even weight gain and aging. A reduction in AGEs in the diet may lead to an extension of life span; prevention/reduction of weight gain; prevention of insulin resistance; prevention of heart disease; and improvement of oxidative stress. Many scientific papers have been written postulating links between AGEs and various disease states. One such paper is entitled "Advanced Glycation Endproducts" by Wauthier and Guillasseau, Diabetes Metab (Paris) 2001, 27, 535-542. See also International Patent Publication No. WO 2006/029298 A1 entitled "Nutritional Products Having Improved Quality And Methods And Systems Regarding Same". The foregoing paper and published patent application are hereby incorporated by reference in their entireties as part of the present disclosure.

Typically, infant formula and other liquid nutrition products must be pre-processed to achieve the final composition and to uniformly disperse and solubilize all formula ingredients (proteins, carbohydrates, lipids and other nutrients) and to produce a homogenous emulsion. The emulsion is further processed by high pressure homogenizations and heating to assure homogeneity and reduce bacterial load. If a ready-to-feed liquid is desired, the emulsion is filled into appropriate packaging and subjected to a further heat treatment. The heat treatment may be applied either before filling in which case filling is carried out under aseptic conditions or the filled containers may themselves be heat treated in a retort process. In addition, some infant formulas are produced and packaged for the first feeding in hospitals. Many such hospital-targeted products are produced in ready-to-feed liquid form in small bottles called nursettes, and are sterilized in such containers by retort processing.

The majority of destructive reactions and of undesirable Maillard reactions that lead to various decomposition and polymerization products including AGEs occur when proteins, lipids and carbohydrates are heated in a liquid phase. This intensive heating is also a factor that leads to the decomposition of various heat labile nutrients. Once they begin during the heating process, many chemical reactions continue, although at slower reaction rates, throughout the storage of either liquid or dry products at room temperature. It should also be noted that under factory conditions it may be necessary for batches of liquid product to be kept in holding tanks at various stages in the manufacturing process for reasons such as unplanned work on necessary processing equipment. Any delays occurring in this way will increase the potential for AGE formation.

Formulations containing whey proteins, bioactive compounds and other nutritional components found in human milk can be necessary for infant formula, especially for low birth weight infants when feeding with human milk is not an option. The heat lability and reactivity of some of these components makes it particularly difficult to incorporate some of them into liquid formulas which are thermally sterilized. As indicated above, conventional thermal processes can result in nutrient degradation, loss of functionality, reduction of shelf-life and the development of unwanted by products. In order to improve the product quality it is necessary to produce the formula in a manner that minimizes the exposure of those components to excessive heating. Sterilizing such components using cold sterilization processes or less severe heat processes would allow the development of formulas with improved qualities and that more closely approximate human breast milk.

It is an object of the present invention to overcome one or more of the above-described drawbacks and/or disadvantages of the prior art.

SUMMARY OF THE INVENTION

In accordance with a first aspect, the present invention is directed to a method of formulating and aseptically filling liquid products. The method comprises the following steps:

(i) providing a first liquid source including at least one first liquid component;

(ii) providing a second liquid source including at least one second liquid component;

(iii) providing a container including a body defining an empty, sterile storage chamber therein that is sealed with respect to ambient atmosphere;

(iv) introducing the container into a sterile filling chamber;

(v) placing a first filling member coupled in fluid communication with the first liquid source in fluid communication with the storage chamber of the container located in the sterile filling chamber, and aseptically introducing the least one first liquid component through the first filling member and into the storage chamber;

(vi) placing a second filling member coupled in fluid communication with the second liquid source in fluid communication with the storage chamber of the container located in the same or a different sterile filling chamber, and aseptically introducing the least one second liquid component through the second filling member and into the storage chamber and, in turn, combining the at least one first and at least one second liquid components into a liquid product formulation within the sterile chamber of the container; and (vii) withdrawing the first and second filling members from fluid communication with the storage chamber of the container and sealing the filled storage chamber with respect to ambient atmosphere to hermetically seal the liquid product formulation within the storage chamber of the container.

In accordance with some embodiments of the present invention, the method comprises the following steps:

(i) providing a container including a needle penetrable and thermally resealable portion in fluid communication with the storage chamber;

(ii) penetrating the needle penetrable and thermally resealable portion of the container with a first filling needle or other injection member coupled in fluid communication with the first liquid source, and aseptically introducing the least one first liquid component through the first filling needle and into the storage chamber;

(iii) penetrating the needle penetrable and thermally resealable portion of the container with a second filling needle or other injection member coupled in fluid communication with the second liquid source, and aseptically introducing the least one second liquid component through the second filling needle and into the storage chamber and, in turn, combining the at least one first and at least one second liquid components into a liquid product formulation;

(iv) withdrawing the first and second filling needles from the needle penetrable and thermally resealable portion of the container and leaving at least one resulting needle hole therein; and (v) applying laser radiation to the at least one resulting needle hole to thermally reseal the needle penetrable and thermally resealable portion and, in turn, hermetically seal the liquid product formulation within the storage chamber.

The currently preferred embodiments of the present invention further comprise sterilizing the at least one first liquid component and separately sterilizing the at least one second liquid component. In some embodiments of the present invention, at least one of the first and second liquid components is heat labile, and the sterilizing step does not damage, destroy or decompose the heat labile components. In some such embodiments, at least one of the first and second liquid components is heat labile, and such heat labile components are sterilized by filtration. In some such embodiments, the at least one first liquid component is heat labile, the at least one second liquid component is not heat labile, the at least one first liquid component is sterilized by filtration, and the at least one second liquid component is thermally sterilized. In some such embodiments, the at least one first liquid component and the at least one second liquid component are sterilized prior to introducing the first and second liquid components into the storage chamber.

In some embodiments of the present invention, the at least one first liquid component is a micronutrient. In some such embodiments, the micronutrient is selected from the group including minerals, vitamins, hormones, growth factors, nucleotides, polynucleotides, biopolymers, and mixtures of at least one of proteins, carbohydrates and nucleotides. In some embodiments, the at least one first liquid component is a living organism. In some such embodiments, the living organism is selected from the group including probiotics, bacteriophages, yeasts, molds and fungi. In some embodiments, the at least one first liquid component is selected from the group including a flavoring and an aroma. In some embodiments, the at least one second liquid component is selected from the group including water, proteins, carbohydrates and lipids. In some such embodiments, the proteins are selected from the group including milk, vegetable proteins, fractions of milk proteins, fractions of milk protein fractions, and hydrolyzed forms of any of the foregoing; the carbohydrates are selected from the group including lactose, glucose, sucrose, maltodextrins, galactooligosaccharides, glucooligosaccharides, fructooligosaccharides, and other oligosaccharides known to provide explicit physiological benefits or to be present in human or other mammalian milks; and the lipids are selected from the group including lipids of animal, plant or microbial origin.

In accordance with another aspect, the method further comprises the steps of: (i) mounting the sealed, empty container on a conveyor; (ii) transmitting a fluid sterilant onto at least an exposed portion of the container and, in turn, sterilizing with the fluid sterilant at least such exposed portion of the container; (iii) transmitting a heated gas onto the portion of the container exposed to the fluid sterilant, flushing away with the heated gas the fluid sterilant from the exposed portion of the container and, in turn, forming an exposed portion of the container substantially free of fluid sterilant; and (iv) moving the conveyor with the container thereon through the sterile filling chamber.

In some embodiments of the present invention, the at least one first liquid component is a heat labile component, a flavoring and/or an aroma, and the at least one second liquid component defines a base. In some such embodiments, the base is a liquid beverage, such as water, milk, a milk based beverage, soy, a soy based beverage, a dairy product, or a fruit juice. Some embodiments of the present invention further comprise first introducing the at least one first liquid component, and then introducing the base to facilitate mixing the first and at least second liquid components.

Some embodiments of the present invention further comprise introducing the at least one first liquid component and the at least one second liquid component into the storage chamber by pumping each liquid component through first and second filling members or needles, respectively. Some such embodiments further comprise selecting the speed, flow rate and/or time of operation of the pump to control the volume of each of the first and second liquid components introduced into the storage chamber. Some embodiments of the present invention further comprise providing a first driving system or pump drivingly coupled to the first filling member, and a second driving system or pump drivingly coupled to the second filling member. Some such embodiments further comprise reversing the direction of at least one driving system or pump upon terminating introducing a respective first or second liquid component to prevent dripping of the component from the respective filling member into the storage chamber.

In accordance with another aspect, the present invention is directed to an apparatus for formulating and aseptically filling liquid products. The apparatus comprises a first liquid source including at least one first liquid component; at least a second liquid source including at least one second liquid component; a container including a body defining an empty, sterile storage chamber therein that is sealed with respect to ambient atmosphere; and a sterile filling chamber. A first filling member is coupled in fluid communication with the first liquid source, is movable relative to the container located within the sterile filling chamber, and is connectable in fluid communication with the sealed, sterile storage chamber of the container for aseptically introducing the least one first liquid component through the first filling member and into the storage chamber. A second filling member is coupled in fluid communication with the second liquid source, is movable relative to the container located within the same or a different sterile filling chamber, and is connectable in fluid communication with the sealed, empty sterile chamber of the container. The least one second liquid component is aseptically introduced through the second filling member and into the storage chamber, and is combined with the at least one first liquid component into a liquid formulation that is hermetically sealed with respect to ambient atmosphere within the sterile storage chamber of the container In some embodiments of the present invention, the container includes a needle penetrable and thermally resealable portion in fluid communication with the storage chamber. A first filling needle or like injection member is coupled in fluid communication with the first liquid source, and is movable relative to the needle penetrable and thermally resealable portion of the container for aseptically introducing the least one first liquid component through the first filling needle and into the storage chamber. A second filling needle or like injection member is coupled in fluid communication with the second liquid source and is movable relative to the needle penetrable and thermally resealable portion of the container for aseptically introducing the least one second liquid component through the second filling needle and into the storage chamber and, in turn, combining the at least one first and at least one second liquid components into a liquid product formulation. A laser source is connectable in thermal communication with the needle penetrable and thermally resealable portion for applying laser radiation to at least one needle hole resulting from withdrawal of the first and second filling needles from the needle penetrable and thermally resealable portion to hermetically seal the liquid product formulation within the storage chamber.

In some embodiments of the present invention, the apparatus further comprises first means for sterilizing the at least one first liquid component, and second means for separately sterilizing the at least one second liquid component. In some such embodiments, at least one of the first and second liquid components is heat labile, and the respective first or second means does not damage, destroy or decompose the heat labile components. In some such embodiments, the at least one first liquid component is heat labile, the at least one second liquid component is not heat labile, the first means is a filter, and the second means is a thermal sterilization apparatus.

In some embodiments of the present invention, the at least one first liquid component is heat labile, the at least one second liquid component is not heat labile, and the apparatus further comprises (i) a filtration sterilization apparatus coupled in fluid communication with the first liquid source for sterilizing the at least one first liquid component by filtration prior to introducing the at least one first liquid component through the first filling needle or other filling member, and (ii) a thermal sterilization apparatus for thermally sterilizing the at least one second liquid component prior to introducing the at least one second liquid component through the second filling needle or other filling member.

In some embodiments of the present invention, the apparatus further comprises at least one first filling station including at least one first filling needle or other filling member, and at least one second filling station including at least one second filling needle or other filling member. Preferably, the apparatus further comprises at least one pump drivingly coupled to the first and second filling needles or other filling members for pumping the components therethrough. In some such embodiments, the apparatus comprises a first pump drivingly coupled to the first filling member, and a second pump drivingly coupled to the second filling member. In some such embodiments, each of the first and second filling stations includes a filling manifold including a plurality of filling members spaced relative to each other and movable relative to a container support for penetrating or otherwise being placed in fluid communication with a plurality of containers mounted on the support, filling the containers through the filling members, and withdrawing the filling members from the filled containers. In such embodiment including containers with needle penetrable and thermally resealable portions, the apparatus preferably further comprises a plurality of laser assemblies. Each laser assembly is connectable to a source of laser radiation, and is focused substantially on a penetration spot on the needle penetrable and thermally resealable portion of a respective container for applying laser radiation thereto and resealing the respective penetration aperture(s).

In some embodiments of the present invention, the apparatus further comprises a housing defining an inlet end, an outlet end, and at least one sterile chamber located between the inlet and outlet ends. A conveyor is located at least partially within the sterile chamber and defines a plurality of container positions thereon for supporting and moving containers in a direction from the inlet end toward the outlet end through the sterile chamber. In some such embodiments, a fluid sterilant station is located within the sterile zone and is coupled in fluid communication with a source of fluid sterilant for transmitting fluid sterilant onto at least an exposed portion of a respective container supported on the conveyor within the fluid sterilant station, and sterilizing at least the exposed portion of the respective container. Such embodiments further comprise at least one sterilant removing station located within the sterile chamber between the fluid sterilant station and the outlet end of the housing, and coupled in fluid communication with a source of heated gas for transmitting the heated gas onto a container supported on the conveyor within the at least one sterilant removing station to flush away fluid sterilant on the container. In some such embodiments, the filling members, and laser optic assemblies when employed, are located within the sterile chamber between the at least one sterilant removing station and the outlet end of the housing for receiving the sterilized containers therefrom. In some such embodiments, the fluid sterilant is hydrogen peroxide. Some embodiments further comprise a source of sterile gas coupled in fluid communication with the sterile chamber for creating an over pressure of sterile gas within the sterile chamber, and means for directing a flow of sterile gas substantially in a direction from the outlet end toward the inlet end of the housing to thereby prevent fluid sterilant from flowing onto containers located adjacent to the filling members.

In some embodiments of the present invention, the conveyor includes a plurality of pivotally mounted container supports that engage opposing sides of a respective container supported thereon relative to each other, and substantially isolate a sterile portion of the container located above the container supports relative to a portion of the container located below the container supports to thereby prevent any contamination on the lower portion of the container from contaminating the sterile upper portion of the container. In those embodiments with containers that are needle penetrable and thermally resealable, the sterile portion of the container located above the supports includes the needle penetrable and thermally resealable portion.

In some embodiments of the present invention, the penetrable and thermally sealable portion of the container is a thermoplastic elastomer that is heat sealable to hermetically seal the penetration aperture(s) by applying laser radiation at a predetermined wavelength and power thereto, and defines (i) a predetermined wall thickness, (ii) a predetermined color and opacity that substantially absorbs the laser radiation at the predetermined wavelength and substantially prevents the passage of the radiation through the predetermined wall thickness thereof, and (iii) a predetermined color and opacity that causes the laser radiation at the predetermined wavelength and power to hermetically seal the penetration aperture formed in the penetrable region thereof in a predetermined time period of less than or equal to about 5 seconds and substantially without burning the penetrable region.

In some embodiments of the present invention, the penetrable and thermally sealable portion of the container is a thermoplastic elastomer that is heat sealable to hermetically seal the penetration aperture by applying laser radiation at a predetermined wavelength and power thereto, and includes (i) a styrene block copolymer; (ii) an olefin; (iii) a predetermined amount of pigment that allows the penetrable portion to substantially absorb laser radiation at the predetermined wavelength and substantially prevent the passage of radiation through the predetermined wall thickness thereof, and hermetically seal the penetration aperture(s) formed in the penetrable portion in a predetermined time period of less than or equal to about 5 seconds; and (iv) a predetermined amount of lubricant that reduces friction forces at an interface of the filling member and penetrable portion.

In some embodiments of the present invention, the penetrable and thermally sealable portion of the container is a thermoplastic elastomer that is heat sealable to hermetically seal the penetration aperture(s) by applying laser radiation at a predetermined wavelength and power thereto, and includes (i) a first polymeric material in an amount within the range of about 80% to about 97% by weight and defining a first elongation; (ii) a second polymeric material in an amount within the range of about 3% to about 20% by weight and defining a second elongation that is less than the first elongation of the first polymeric material; (iii) a pigment in an mount that allows the second material portion to substantially absorb laser radiation at the predetermined wavelength and substantially prevent the passage of radiation through the predetermined wall thickness thereof, and hermetically seal a penetration aperture formed in the penetrable region thereof in a predetermined time period of less than or equal to about 5 seconds; and (iv) a lubricant in an amount that reduces friction forces at an interface of the filling member and penetrable portion during penetration thereof.

In accordance with another aspect, the present invention is directed to an apparatus for formulating and aseptically filling liquid products. The apparatus comprises first means for supplying at least one first liquid component; second means for supplying at least one second liquid component; a container including a body defining an empty, sterile storage chamber therein that is sealed with respect to ambient atmosphere; a sterile filling chamber; third means coupled in fluid communication with the first means and movable relative to the container located within the sterile filling chamber for connecting the first means in fluid communication with the sterile storage chamber and aseptically introducing the least one first liquid component therethrough and into the storage chamber; and fourth means coupled in fluid communication with the second means and movable relative to the container located within the same or a different sterile filling chamber for connecting the second means in fluid communication with the sterile storage chamber and aseptically introducing the least one second liquid component therethrough and into the storage chamber and, in turn, combining the at least one first and at least one second liquid components into a liquid formulation sealed with respect to ambient atmosphere within the storage chamber.

In some embodiments of the present invention, the container includes a penetrable and thermally resealable portion in fluid communication with the storage chamber. The third means are coupled in fluid communication with the first means and movable relative to the container for penetrating the penetrable and thermally resealable portion of the container and aseptically introducing the least one first liquid component therethrough and into the storage chamber. The fourth means are coupled in fluid communication with the second means and movable relative to the container for penetrating the penetrable and thermally resealable portion of the container, and aseptically introducing the least one second liquid component therethrough and into the storage chamber and, in turn, mixing the at least one first and at least one second liquid components into a liquid product formulation. In these embodiments, fifth means are connectable in thermal communication with the penetrable and thermally sealable portion of the container for thermally sealing the penetration aperture(s) to hermetically seal the liquid product formulation within the storage chamber. In some embodiments of the present invention, the first means is a first liquid chamber, the second means is a second liquid chamber, the third means is a first filling member, such as a filling needle, the fourth means is a second filling member, such as a filling needle, and the fifth means is a laser.

One advantage of the present invention is that heat labile components can be sterilized at cold or ambient temperatures, and thus the apparatus and method of the present invention can overcome the drawbacks and disadvantages associated with thermal sterilization encountered in the prior art. Yet another advantage of the present invention is that the components that are not heat labile can be thermally sterilized, and the separately sterilized components can be aseptically filled and combined into a desired liquid formulation in the storage chamber.

Other objects and advantages of the present invention, and/or of the currently preferred embodiments thereof, will become more readily apparent in view of the following detailed description of currently preferred embodiments and accompanying drawings.

DETAILED DESCRIPTION OF CURRENTLY PREFERRED EMBODIMENTS

Figure 1:
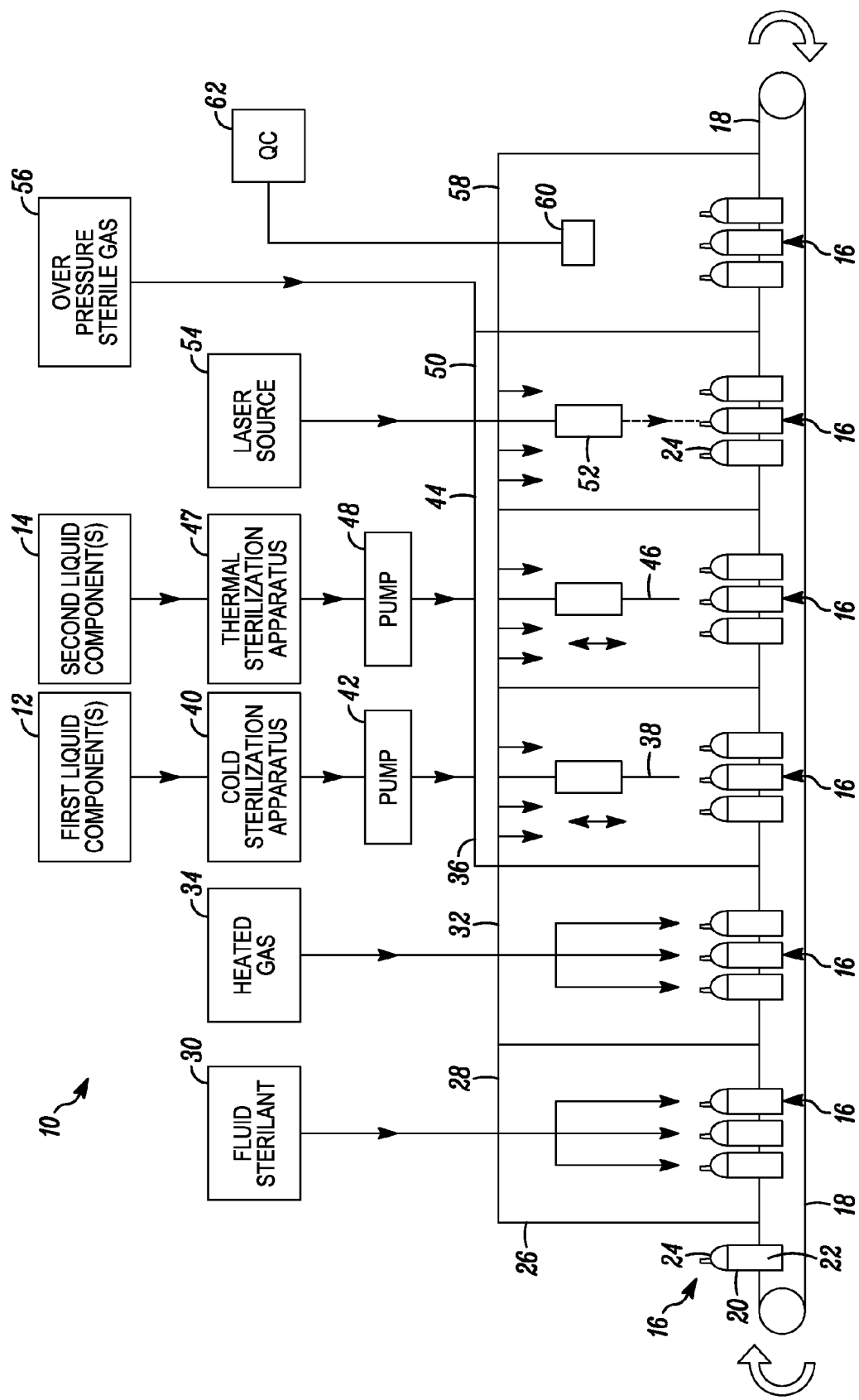
FIG. 1 is a schematic illustration of a first embodiment of an apparatus embodying the present invention.

In FIG. 1, an apparatus embodying the present invention is indicated generally by the reference numeral 10. The apparatus 10 comprises a first liquid source 12 including at least one first liquid component, and a second liquid source 14 including at least one second liquid component. A plurality of containers 16 are mounted on a conveyor 18 and transported by the conveyor through the apparatus. Each container 16 includes a body 20 defining an empty, sterile storage chamber 22 therein, and a penetrable and thermally resealable portion 24 in fluid communication with the storage chamber. The apparatus 10 includes a housing 26 defining a barrier enclosure for receiving therein sealed, empty sterile containers 16 transported on the conveyor 18, sterilizing the exterior portions of the containers, aseptically filling the containers with the first and second liquid components (and other components if desired) and combining the liquid components within the storage chambers 22 of the containers into a liquid product formulation, and laser sealing the penetration aperture(s) formed in the penetrable and thermally resealable portions 24 to seal the liquid product formulation within the containers.

The housing 26 includes a plurality of stations through which the conveyor 18 transports the containers 16 for processing. The containers are provided to the apparatus 10 in a sealed, empty sterile condition, i.e., the sealed empty chambers 22 of the containers are sterile. However, the exterior surfaces of the containers may not be sterile. Accordingly, the apparatus 10 includes a first station 28 that sterilizes at least the penetrable and thermally resealable portions 24 of the containers 16 with a fluid sterilant, such as vaporized hydrogen peroxide ("VHP"), provided by a fluid sterilant source 30.

A second station 32 transmits a heated gas 34 onto the surfaces of the containers to evaporate the fluid sterilant and, in turn, provide dry sterile containers 16 for subsequent filling and sealing. If desired, other sterilizing mechanisms equally may be employed, such as ebeam, gamma or other irradiation.

A third station 36 has mounted therein at least one first filling member 38, such as a filling needle, coupled in fluid communication with at least one first liquid component(s) source 12. As indicated by the arrows in FIG. 1, each first filling member 38 is drivingly mounted and movable relative to the needle penetrable and thermally resealable portions 24 of the containers 16 received in the third station 36 for aseptically introducing the first liquid component(s) 12 through the first filling member 38 and into the storage chamber 22 of the respective containers. A cold sterilization apparatus 40 and a pump 42 are coupled in fluid communication with the first liquid component source 12 and first filling member 38. In the illustrated embodiment, the cold sterilization apparatus 40 is a microfilter, such as a 0.2 micron filter, and the pump 42 is a positive displacement pump. Accordingly, the first liquid component(s) is/are pumped through the cold sterilization apparatus 40 and the resulting sterile liquid component(s) is/are aseptically introduced through the first filling member 38 into the sterile storage chamber 22 of a respective container.

A fourth station 44 has mounted therein at least one second filling member 46, such as a filling needle, coupled in fluid communication with at least one second liquid component(s) source 14. As indicated by the arrows in FIG. 1, each second filling member 46 is drivingly mounted and movable relative to the needle penetrable and thermally resealable portions 24 of the containers 16 received in the fourth station 44 for aseptically introducing the second liquid component(s) 14 through the second filling member 46 and into the storage chamber 22 of the respective containers. A thermal sterilization apparatus 47 and a pump 48 are coupled in fluid communication to the second liquid component source 14 and second filling member 46. In the illustrated embodiment, the thermal sterilization apparatus 47 is of a type known to those of ordinary skill in the pertinent art for thermally sterilizing liquid food products, and the pump 48 is a positive displacement pump. Accordingly, the second liquid component(s) is/are are thermally sterilized in the thermal sterilization apparatus 47 and the resulting sterile liquid component(s) is/are pumped through the second filling needle 46 and aseptically introduced into the sterile storage chamber 22 of the respective containers.

A fifth station 50 includes at least one laser optic assembly 52 optically coupled to at least one laser source 54 and connectable in thermal communication with the needle penetrable and thermally resealable portions 24 of the containers 16 passing through the fifth station. The laser optic assembly 52 transmits laser radiation from the laser source 54 to the needle hole(s) resulting from withdrawal of the first and second filling members 38 and 46, respectively, from the needle penetrable and thermally resealable portion 24 of the respective containers to hermetically seal the aseptic liquid product formulation within the storage chambers.

A source of pressurized sterile gas 56 is coupled in fluid communication with at least the third, fourth and fifth stations to provide an overpressure (or laminar flow) of sterile gas and, in turn, maintain the sterility of the penetrable and thermally resealable surfaces 24 of the containers and of the filling members 38 and 46 within the barrier enclosure. A sixth station 58 is provided to optically detect the temperature of the resealed portions of the containers (or this can be performed within the laser resealing station 50, if desired, or more practicable), and otherwise to perform the desired quality control operations on the aseptically filled and sealed containers prior to their discharge from the apparatus 10.

The sixth station 58 includes one or more optical sensors 60 for optically detecting the temperatures of the sealed portions of the containers and associated electronics and displays 62 for recording and displaying the date and otherwise providing notification and enabling discarding of any containers that are out of specification.

Figure 2:
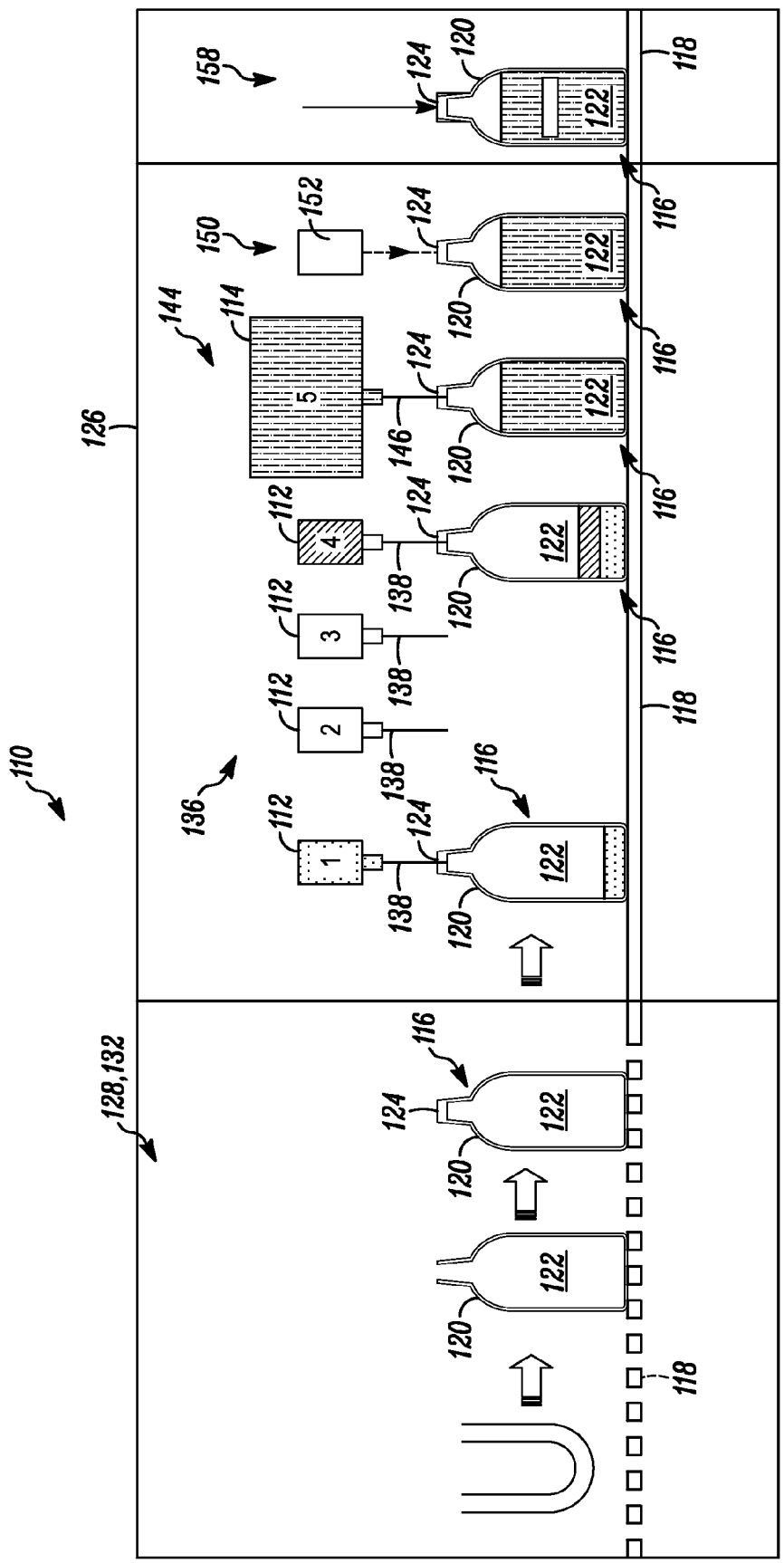
FIG. 2 is a schematic illustration of a second embodiment of an apparatus embodying the present invention.

In FIG. 2, another apparatus embodying the present invention is indicated generally by the reference numeral 110. The apparatus 110 is substantially similar to the apparatus 10 described above with reference to FIG. 1, and therefore like reference numerals preceded by the numeral "1" are used to indicate like elements. As can be seen, the apparatus 110 includes first and second stations 128 and 132, respectively, for sterilizing the filling surfaces of the containers, such as the penetrable and resealable stoppers, or filling valves, and for transmitting a heated gas onto such surfaces in the event a fluid sterilant is employed. A third station 136 includes a plurality of first liquid component sources 112 (numbered "1" through "4" in the figure) mounted in series relative to each other over the conveyor 118, and a fourth station 144 includes at least one second liquid component source 114 mounted over the conveyor 118. A fifth station 150 includes a laser source 152, and a sixth station 158 includes devices for quality control, tamper-evident capping and labeling. As shown at the inlet to the housing 126, the container bodies 120 are formed by blow molding (or other type of molding, such as injection molding) and septum capping with the penetrable and resealable septums 124, or capping with filling valves (not shown) (i.e., as can be seen, each body 120 may start out as a perform which is blow molded into the final body shape and capped with the penetrable and resealable septum, or capped with a filling valve, etc.). This approach may be particularly desirable for achieving the benefits of "just in time" manufacturing (i.e., molding and filling). If desired, the bodies 120 and caps 124 may be aseptically molded in accordance with the teachings of the co-pending patent applications incorporated by reference below to form containers 116 with sealed, empty, sterile chambers 122 ready for aseptic filling. Alternatively, the sealed empty containers may be non-aseptically assembled and sterilized in a more conventional manner, such as by subjecting the sealed empty containers to gamma radiation.

Each sealed, empty, sterile container 116 may be filled in the apparatus 110 with any of a variety of different liquid components, in any of a variety of different orders of filling the different liquid components, to create any of a variety of different liquid product formulations. In one embodiment, the first liquid component source 112 numbered "1" contains a first nutrient, the second liquid component source 112 numbered "2" contains a second nutrient, the first liquid component source 112 numbered "3" contains a flavor "A", the first liquid component source 112 numbered "4" contains a flavor "B", and the second liquid component source 114 numbered "5" contains a base liquid. The apparatus 110 includes a programmable controller that is programmable to control the apparatus to fill any desired combination of the liquid component sources to form any of a variety of different liquid product formulations. For example, one batch of containers may be filled with the first liquid component nutrient "1", the flavor "B", and then the base "5". Alternatively, these same components may be filled in a different order by moving the conveyor 118 forwardly and then backwardly, or vice versa. Other product formulations may be aseptically created and filled in the same manner. As described further below, any of numerous different product formulations may be aseptically filled in the apparatus 10 or 110. In the illustrated embodiment, after each container is filled with the desired liquid components to create the desired liquid product formulations, the septums 124 are sealed in the station 150, such as by laser resealing, and as indicated by the arrow in FIG. 2, an over cap is applied to the sealed septum, such as a tamper-evident over cap, and labeling is applied, in the station 158. If a filling valve is used instead of the needle penetrable septum, the laser resealing step may be eliminated.

As may be recognized by those of ordinary skill in the pertinent art based on the teachings herein, the apparatus 10 and 110 may take any of numerous different configurations involving any of numerous different types of stations and components that are currently known, or that later become known, including any of numerous different devices or methods for sterilizing the external surfaces of the containers; any of numerous different types of filling members, needles or other injection members; any of numerous different numbers of filling members, needles or other injection members; any of numerous different types of hot or cold sterilization apparatus or processes; any of numerous different types of pumps; any of numerous different configurations of liquid component sources, sterilization apparatus and/or pumps; any of numerous different liquid components, any desired number of such components, and any desired combination of components forming any of a variety of different product formulations; and any of numerous different sealing devices or processes, including chemical sealing devices or processes, or thermal sealing devices or processes, such as laser sealing devices, or sealing devices that apply other forms of energy to thermally reseal penetration aperture(s), such as electrical, radiofrequency, microwave, ultrasonic, or ultrasound energy application devices. For example, the sterilization apparatus 40 and 47 may be either cold or thermal sterilization apparatus.

The method and apparatus of the invention also may be employed to make any of numerous different liquid product formulations that are currently known, or that later become known, including without limitation the following exemplary formulations:

Water Plus Formulations

Exemplary "water plus" formulations include "vitamin waters", i.e., waters with vitamins added to them, and/or waters with flavorings, such as fruit flavorings added to them. Exemplary prior art products of this type are produced using a "hot fill" process (i.e., a fill temperature within the range of about 170-185 F). One of the drawbacks of the prior art hot fill approach is that it requires a relatively heavy weight bottle to withstand temperature and vacuum conditions upon cooling.

In the exemplary "water plus" formulations of the present invention, a base or water is introduced into the container at one filling station and the "plus" (e.g., vitamins and/or flavorings) is introduced in another filling station. The base (water) is processed in any of numerous different ways that are currently known, or that later become known, including hot or cold sterilization prior to being aseptically filled into the container at about ambient temperature. The "plus" components, on the other hand, are cold sterilized, such as by cold sterile filtration (e.g., 0.2 micron filtration), and introduced into the container in a separate filling member, needle or fill station to thereby allow for improved quality with minimal heat degeneration. If desired, the "plus" may be introduced into the containers prior to introducing the water (or "base"), or the order of injecting the components may be selected, in order to facilitate desired mixing of the components into the resulting liquid product formulation.

One advantage of the currently preferred embodiments of the present invention is that the apparatus can include any number of filling members, needles or associated filling stations. For example, the apparatus can include any desired number of "base" filling needles, members or associated stations for filling the base component(s), such as water (or, for example, milk, non-dairy creamer or soy, as described below), and any desired number of "plus" filling members, needles or associated stations, such as different filling members, needles or stations for filling different flavorings, vitamins, nutritional supplements, other ingredients and/or aromas. As a result, different product formulations can be made by simply employing different filling needles, members or stations of the same apparatus, and thus can be made without the downtime and associated system cleaning and sterilization required when changing over prior art filling lines from one product or product configuration to another. Yet another advantage of the present invention is the provision of a closed, sterilized container that eliminates the need for rinsing before filling and thus can significantly reduce the overall water and waste requirements for a bottling facility in comparison to the prior art. Yet another advantage of some currently preferred embodiments of the present invention is that space allocations for the rinsing of bottles or other containers can be minimized to a "receiving" area only, thus further reducing the requirements and associated costs in comparison to the prior art.

Yet another advantage is that the present invention can enable more streamlined and/or efficient distribution of liquid product formulations. Apparatus of the present invention can be significantly smaller and more simplified in comparison to prior art aseptic filling systems, thus requiring smaller facilities in comparison to the prior art. As a result, manufacturers and/or distributors can set up apparatus of the present invention in different geographic locations relatively widely spaced from each other, such as different locations throughout a country, so that containers can be filled at or very close to desired points of distribution, such as points of regional or local distribution, thus reducing distribution costs (such as shipping and inventory costs) in comparison to the prior art. Further, the apparatus and methods of the invention, and the ability to fill closer to distribution points, facilitate "just in time" or "fill to order" formulation and filling, as opposed to "filling to stock" whereby relatively large inventories of filled products are maintained and/or such relatively large inventories are maintained at centrally located bottling facilitates and/or distribution centers. A still further advantage is that the empty containers can be manufactured at one or more relatively large and/or centrally located facilities, and the empty containers can be shipped to the regional, local or otherwise more geographically diverse filling facilities to reduce the costs otherwise associated with shipping filled containers and/or maintaining inventories of such filled containers.

Dairy Formulations

As indicated above, prior art dairy based products are typically processed through a UHT (ultra high temperature) system. A typical such heat sterilization process involves injecting steam directly into the product to subject the product to high temperature sterilization (e.g., about 298 F for about 5 seconds) which can cause browning and degradation of flavors and vitamins. Another drawback of such prior art processes is that the water added during steam injection must be removed by vacuum which can, in turn, lead to further loss of flavors by vacuum.

The exemplary dairy formulations of the present invention allow for the introduction of heat sensitive components via a different needle or other filling member (or associated filling station) than the non heat or oxygen sensitive components. As with the previous example, such heat sensitive components may be cold filtered through, for example, a 0.2 micron filter, in order to sterilize the components prior to filling.

In some exemplary embodiments of the present invention, one or more "base" filling stations are provided for filling the base product. In some such examples, the base is a dairy creamer, non-dairy creamer or soy containing liquid product formulation that includes non heat sensitive components and may be thermally sterilized. One or more other "plus" filling stations are provided for filling various "plus" components, such as different flavorings, supplements, aromas, and/or other ingredients. For example, in the context of coffee creamers, the plus station may include different flavorings, such as hazelnut, vanilla, cappuccino, etc. Different product formulations can be made by selectively filling the containers in different plus filling stations. For example, a hazelnut flavored coffee creamer can be made by filling a hazelnut flavoring and then filling the base creamer (e.g., a base dairy creamer, non-dairy creamer or soy containing liquid formulation). Other flavored creamers can be made in the same apparatus by filling other flavorings in different filling stations with the same base creamer, thus allowing any of a variety of different products to be formulated and filled in the same apparatus without breaking down and cleaning the apparatus between different product fills as encountered in the prior art. In other exemplary embodiments, the products may be dairy based beverages including a base dairy product, such as a milk based product, provided in one or more first filling stations, and a variety of "plus" products, such as flavorings (e.g., chocolate, strawberry, blueberry, banana, cappuccino, coffee aroma, etc.) and/or nutritional supplements, provided in a plurality of "plus" filling stations. Yet another advantage of the present invention is that it enables separate cold sterilization and filling of heat labile components to further improve taste and/or quality in comparison to the prior art.

As in the previous example, one advantage of the currently preferred embodiments of the present invention is that the plural filling members, needles and/or stations allow for switching from one product formulation or variation to another without requiring the system cleaning, sterilization and/or downtime associated with prior art dairy filling systems. Yet another advantage of the present invention is that the heat sensitive or reactive components, such as flavors and vitamins, can be cold sterilized, and aseptically filled apart from the non heat sensitive or reactive components, thus avoiding the browning and degradation, and/or loss of flavors, vitamins, and other heat sensitive or reactive components as encountered in the prior art.

Infant Formulations

In the currently preferred embodiments of the present invention, heat labile or reactive components of the infant formula are prepared in separate solutions which are sterilized by microfiltration or other cold sterilization processes and are later aseptically combined in the sterile storage chambers of the containers with the remainder of the formula previously sterilized by thermal sterilization, such as conventional UHT sterilization. Exemplary heat labile components include water soluble vitamins, such as vitamin C, folic acid, vitamin B1, and any other vitamins which are affected by thermal processing. Exemplary proteins include whey, alpha-lactalbumin and other protein fractions that are denatured by heat. Exemplary carbohydrates include lactose or other sugars as well as prebiotics which undergo Maillard browning. The heat labile components also may include bioactive nutrients including Lactoferrin, Lysozyme, Lactoperoxidase, and other bioactive nutrients that have health benefits and cannot withstand thermal processing. The reactive components include the trace elements such as iron and copper which by processing separately can result in improved fat and vitamin stability.

The cold sterilized heat labile and/or reactive components can be mixed in an aseptic environment with the previously heat sterilized non heat labile or reactive components, and the resulting mixture can be aseptically filled into the containers. Or, preferably, the cold sterilized components are first mixed and cold sterilized, or cold sterilized separately and then mixed in an aseptic holding tank, and the cold sterilized components are injected through the respective filling member(s) or needle(s) into the sterile storage chambers of the containers. Then, or prior to injecting the cold sterilized components, the non heat labile and/or non reactive components are mixed and heat sterilized, or heat sterilized and then mixed in an aseptic holding tank, and the heat sterilized components are injected through the respective filling member(s) or needle(s) into the storage chambers of the containers. The cold sterilized and heat sterilized products are thus combined in the sterile chambers of the containers to thereby form sterile filled liquid product formulations that may exhibit in comparison to the prior art improved quality with respect to vitamin and/or flavor content, and/or improved quality with respect to the content of other components or ingredients that are heat labile or reactive.

An exemplary infant formula includes a protein blend having an approximately 60:40 Whey:Casein ratio similar to human milk where the whey includes, if desired, a blend of alpha-lactalbumin and whey protein concentrate. The alpha-lactalbumin solution is sterilized by microfiltration or other cold sterilization processing, and therefore the denaturation encountered in prior art thermal processing is avoided. The water soluble vitamins that degrade during thermal processing likewise can be included in the alpha-lactalbumin solution to further minimize any vitamin loss that otherwise would occur during thermal processing. In one such embodiment, vitamin C is cold sterilized as part of the alpha-lactalbumin solution. A significant advantage of the present invention is that it can enable manufacturers of infant formulas to consistently meet predetermined or established minimum amounts of Vitamin C and maximum amounts of by-products produced through the breakdown of Vitamin C.

Table 1 below sets forth an exemplary infant formulation including ingredients that are separately cold sterilized and heat sterilized as indicated, and then injected through respective filling needles, other filling members, or associated filling stations into the sterile chambers of the containers. The term "cold sterilized" as used herein does not mean that the components are necessarily chilled, but rather contemplates any type of sterilization that does not thermally sterilize (i.e., heat) the components, and thus "Scold sterilization" may be performed at ambient temperature, or at a temperature above or below ambient temperature.

TABLE 1

| Ingredients | % range (approximate) |
|---|---|
| Cold Filtered Portion (approximately 1.5% of formula) | |
| Water for Cold Filter Solution | 1.200-1.500 |
| Alpha-Lactalbumin | 0.150-0.50 |
| Vitamin C Sodium Ascorbate | 0.0060-0.04 |
| Vitamin Calcium Pantothenate | 0.00025-0.0005 |
| Vitamin B1 Thiamin Mononitrate | 0.00003-0.0002 |
| Vitamin Folic Acid | 0.00001-0.000025 |

TABLE 1-continued

| Ingredients | % range (approximate) |
|---|---|
| Thermally Processed Portion (approximately 98.5% of formula) | |
| Water for Thermal Processed Portion | 84.0-86.0 |
| Milk Nonfat Dry | 1.50-2.50 |
| Whey Protein Concentrate | 1.00-1.60 |
| Lactose | 3.0-4.0 |
| Maltodextrin | 2.0-3.0 |
| Vegetable Oils (Palm Olein, Soy, Coconut, High Oleic Safflower) | 2.20-4.00 |
| Soy lecithin | 0.025-1.00 |
| DHA Oil and ARA Oil | 0.05-0.100 |
| Carrageenan | 0-0.025 |
| Calcium Citrate tetrahydrate | 0.062-0.09 |
| Calcium Phosphate | 0.009-0.014 |
| Ferrous Sulfate heptahydrate | 0.00048-0.0095 |
| Magnesium Chloride heptahydrate | 0.005-0.015 |
| Zinc Sulfate | 0.0022-0.015 |
| Copper Sulfate pentahydrate | 0.00015-0.00025 |
| Manganese Sulfate monohydrate | 0.000003-0.00003 |
| Potassium Citrate | 0-0.10 |
| Potassium Chloride | 0-0.10 |
| Sodium Chloride | 0-0.020 |
| Potassium Iodide | 0.0055-0.009 |
| Sodium Selenate decahydrate | 0.000005-0.00004 |
| Inositol | 0.0025-0.0035 |
| L-Carnitine | 0.0008-0.0015 |
| Taurine | 0.0025-0.0078 |
| Choline Bitartrate | 0.015-0.05 |
| Vitamin Biotin | 0.00028-0.0004 |
| Vitamin E-DL Alpha Tocopheryl Acetate | 0.0014-0.003 |
| Vitamin Riboflavin | 0.00007-0.00013 |
| Vitamin Pyridoxine HCl | 0.000025-0.000050 |
| Vitamin A Acetate 325,000 IU/g | 0.0005-0.0015 |
| Vitamin D3 100,000 IU/gram | 0.00025-0.00065 |
| Vitamin K1 | 0.000004-0.000006 |
| Vitamin B12 | 0.00000025-0.0000015 |
| Nucleotides | 0.0025-0.005 |

Table 2 below sets forth in further detail an exemplary infant formulation including ingredients that are separately cold sterilized and heat sterilized as indicated, and then injected through respective filling needles, other filling members, or associated filling stations into the sterile chambers of the containers.

TABLE 2

| Ingredients | % (approximate) |
|---|---|
| Cold Sterilized Components (approximately 1.53% of formula) | |
| Water for Cold Filter Solution | 1.2000 |
| Alpha-Lactalbumin (Whey Protein), Bio Pure Davisco | 0.3000 |
| Vitamin C Sodium Ascorbate | 0.025000 |
| Vitamin Calcium Pantothenate | 0.000265 |
| Vitamin B1 Thiamin Mononitrate | 0.000100 |
| Vitamin Folic Acid | 0.000016 |
| Heat Sterilized Components (approximately 98.47% of formula) | |
| Water for Heat Processed Portion | 85.646100 |
| Milk Nonfat Dry | 1.9800 |
| Whey CONC Dry 35, Daritek | 1.3000 |
| Lactose | 3.6000 |
| Maltodextrin | 2.2200 |
| Vegetable Oils (Palm Olein, Soy, Coconut, High Oleic Safflower) | 3.2180 |
| Soy lecithin | 0.0750 |
| DHASCO DHA Oil (40-45% DHA), Martek | 0.029000 |
| ARASCO ARA (38-44% ARA), Martek | 0.0580 |
| Carrageenan SeaKem CM 615 | 0.010000 |
| Calcium Citrate *4 H2O | 0.0750 |
| Calcium Phosphate Micro | 0.011200 |

TABLE 2-continued

| | % (approximate) |
|---|---|
| Ferrous Sulfate* 7 H2O | 0.005100 |
| Magnesium Chloride | 0.012500 |
| Zinc Sulfate | 0.001300 |
| Copper Sulfate 5H2O | 0.000210 |
| Manganese Sulfate 1 H2O | 0.000026 |
| Potassium Citrate | 0.0550 |
| Potassium Chloride | 0.028919 |
| Sodium Chloride | 0.006800 |
| Potassium Iodide | 0.005944 |
| Sodium Selenate *10 H2O | 0.000008 |
| Inositol | 0.002810 |
| L-Carnitine | 0.001200 |
| Taurine | 0.050000 |
| Choline Bitartrate | 0.0375 |
| Vitamin Biotin 1% | 0.036049 |
| Vitamin E-DL Alpha Tocopheryl acetate | 0.002672 |
| Vitamin Riboflavin | 0.000083 |
| Vitamin Pyridoxine HCl | 0.000052 |
| Vitamin A Acetate 325,000 IU | 0.000892 |
| Vitamin D3 100,000 IU/gram | 0.000582 |
| Vitamin K1 1% SD | 0.000446 |
| Vitamin B12 0.1% SD | 0.000259 |
| Cytidine 5' Monophosphate | 0.001500 |
| Disodium Uridine 5' Monophosphate | 0.001000 |
| Niacinamide | 0.000877 |
| Adenosine 5' Monophosphate | 0.000330 |
| Disodium Guanosine 5" Monophosphate | 0.000200 |
| Calculated total per 100 grams | 100.000 |
| Specifications | |
| Specific Gravity | 1.036 |
| Whey % of Protein | 60.0 |
| Casein % of Protein | 39.5 |
| α Lactalbumin % of Protein | 27.9 |
| LNAA: Tryptophan | 14.11 |
| DHA % of fat | 0.337 |
| ARA % Of Fat | 0.641 |
| Calcium: Phosphorus | 1.741 |

The currently preferred embodiments of the present invention not only involve separate filling of cold sterilized and heat sterilized ingredients, but also involve, if desired, filling heat sterilized ingredients separately from each other and/or filling cold sterilized ingredients separately from each other. The thermal processing of proteins and carbohydrates together can give rise to Maillard reactions, and thus it may be desirable to thermally sterilize such ingredients (and/or other ingredients) separately in order to avoid Maillard and/or other undesirable chemical reactions. Such separately thermally sterilized ingredients can be combined prior to filling, or may be separately filled into the containers through separate filling needles or other filling members. In addition, iron can react with vitamin C and cause vitamin C loss. Accordingly, it may be desirable to separate certain iron-containing ingredients (such as iron and copper containing ingredients) into one fluid source, and to separate vitamin C containing ingredients (such as vitamin C and other vitamins) into another fluid source. These different fluid sources can be filled into the containers through separate filling needles or other filling members to avoid combining such ingredients prior to filling, and therefore to further reduce or eliminate the loss of vitamin C or other vitamins through undesirable reaction with iron or other ingredients in the other fluid source. Further, it may be desirable to separately fill calcium or calcium containing ingredients separately from protein or protein-containing ingredients to substantially prevent or eliminate protein precipitation that can occur when calcium is combined with protein. Accordingly, the currently preferred embodiments of the present invention can involve any of numerous different liquid or other sources of components that are separately sterilized, aseptically filled through separate filling needles or other filling members into one or more sterile chambers of containers, and combined therein into desired liquid product formulations.

Another advantage of the present invention is that it can enable the production of an infant formula that is more similar to human milk and that has enhanced nutritional quality in comparison to prior art infant formulas. Another advantage of currently preferred embodiments of the present invention is that reduced vitamin losses and therefore reduced over dosage of vitamins for cost benefit can be achieved. Another advantage is that improved protein quality with less denaturation and therefore closer to protein quality of human milk and potentially improved stability with less protein sedimentation and gelation can be achieved. Yet another advantage of the present invention is that it can enable less oxidation of the vitamins and fats for improved nutritional and sensory qualities in comparison to the prior art. A further advantage of the present invention is that it can minimize other reactions such as Maillard Browning that otherwise would result in poorer nutritional quality of protein and vitamin loss. A still further advantage of the present invention is that it can increase the feasibility of creating a composition closer to human milk with the addition of heat labile nutrients that cannot be added using conventional thermal sterilization.

The Containers And Filling Apparatus

The sterile, empty container and closure assemblies 16 may take the form of any of numerous different containers that are currently known, or that later become known, and may be filled and thermally resealed, or aseptically filled with other filling members and sealed within the containers, with any of numerous different apparatus in any of numerous different ways that are currently known, or that later become known, including any of the containers and apparatus and methods for filling disclosed in any of the following patent applications and patents that are hereby incorporated by reference in their entireties as part of the present disclosure: U.S. patent application Ser. No. 11/949,097, filed Dec. 3, 2007, entitled "Device with Needle Penetrable and Laser Resealable Portion and Related Method," similarly-titled U.S. patent application Ser. No. 11/933,300, filed Oct. 31, 2007, both of which are continuations of similarly-titled U.S. patent application Ser. No. 11/879,485, filed Jul. 16, 2007, which is a continuation of U.S. application Ser. No. 11/408,704, filed Apr. 21, 2006, entitled "Medicament Vial Having a Heat-Sealable Cap, and Apparatus and Method for Filling the Vial," now U.S. Pat. No. 7,243,689, which is a continuation of U.S. patent application Ser. No. 10/766,172 filed Jan. 28, 2004, entitled "Medicament Vial Having A Heat-Sealable Cap, And Apparatus and Method For Filling The Vial", now U.S. Pat. No. 7,032,631, which is a continuation-in-part of similarly titled U.S. patent application Ser. No. 10/694,364, filed Oct. 27, 2003, which is a continuation of similarly titled co-pending U.S. patent application Ser. No. 10/393,966, filed Mar. 21, 2003, which is a divisional of similarly titled U.S. patent application Ser. No. 09/781,846, filed Feb. 12, 2001, now U.S. Pat. No. 6,604,561, issued Aug. 12, 2003, which, in turn, claims the benefit of similarly titled U.S. Provisional Application Ser. No. 60/182,139, filed Feb. 11, 2000; similarly titled U.S. Provisional Patent Application No. 60/443,526, filed Jan. 28, 2003; similarly titled U.S. Provisional Patent Application No. 60/484,204, filed Jun. 30, 2003; U.S. patent application Ser. No. 11/933,272, filed Oct. 31, 2007, entitled "Sealed Containers And Methods Of Making And Filling Same," which is a continuation of similarly-titled U.S. patent application Ser. No. 11,515,162, filed Sep. 1, 2006, which is a continuation of similarly-titled U.S. patent application Ser. No. 10/655,455, filed Sep. 3, 2003, now U.S. Pat. No. 7,100,646, U.S. patent application Ser. No. 10/983,178 filed Nov. 5, 2004, entitled "Adjustable Needle Filling and Laser Sealing Apparatus and Method; U.S. patent application Ser. No. 11/901,467, filed Sep. 17, 2007, entitled "Apparatus and Method for Needle Filling and Laser Resealing," which is a continuation of similarly-titled U.S. patent application Ser. No. 11/510,961, filed Aug. 28, 2006, which is a continuation of similarly-titled U.S. patent application Ser. No. 11/070,440 filed Mar. 2, 2005; U.S. patent application Ser. No. 11/074,513 filed Mar. 7, 2005, entitled "Apparatus for Molding and Assembling Containers with Stoppers and Filling Same; U.S. patent application Ser. No. 11/074,454 filed Mar. 7, 2005, entitled "Method for Molding and Assembling Containers with Stoppers and Filling Same"; U.S. patent application Ser. No. 11/339,966, filed Jan. 25, 2006, entitled "Container Closure With Overlying Needle Penetrable And Thermally Resealable Portion And Underlying Portion Compatible With Fat Containing Liquid Product, And Related Method"; and U.S. patent application Ser. No. 11/786,206, filed Apr. 10, 2007 entitled "Ready To Drink Container With Nipple And Needle Penetrable And Laser Resealable Portion, And Related Method"; U.S. patent application Ser. No. 11/650,102, filed Jan. 5, 2007, entitled "One-Way Valve, Apparatus and Method of Using the Valve," which is a continuation of similarly-titled U.S. patent application Ser. No. 11/295,274, filed Dec. 5, 2005, entitled; U.S. patent application Ser. No. 12/021,115, filed Jan. 28, 2008, entitled "Method of Using One-Way Valve and Related Apparatus," which is a continuation of U.S. patent application Ser. No. 11/295,251, filed Dec. 5, 2005, entitled "One-Way Valve, Apparatus and Method of Using the Valve".

Further, the filling assemblies may take any of numerous different configurations that are currently known, or that later become known for filling containers. For example, the filling assemblies may have any of numerous different mechanisms for sterilizing, feeding and/or aseptically filling the liquid components into the sealed empty chamber(s) of the containers. In addition, rather than use the penetrable and resealable stopper, the containers may employ filling valves and filling members for filling through the filling valves as disclosed, for example, in the following patent and patent applications which are hereby incorporated by reference in their entireties as part of the present disclosure: U.S. Application Serial No. 12,025,362, filed Feb. 4, 2008, entitled "Dispenser and Apparatus and Method for Filling a Dispenser," which is a continuation of similarly-titled U.S. application Ser. No. 11/349,873, filed Feb. 8, 2006, which is a continuation of similarly-titled U.S. application Ser. No. 10/843,902, filed May 12, 2004, now U.S. Pat. No. 6,997,219, issued Feb. 14, 2006; U.S. application Ser. No. 11/938,103, filed Nov. 9, 2007, entitled "Device with Chamber and First and Second Valves in Communication Therewith, and Related Method," which is a divisional of U.S. application Ser. No. 10/976,349, filed Oct. 28, 2004, titled "Container and Valve Assembly for Storing and Dispensing Substances, and Related Method". In such alternative embodiments, a first valve is formed or otherwise mounted on the container in fluid communication with the storage chamber to fill the storage chamber therethrough. In addition, the container may include a second valve formed on or otherwise mounted on the container for allowing gas to flow out of the storage chamber during filling thereof, or to allow drawing or evacuation of gas from the storage chamber during filling thereof. Still further, the pumps may take the form of any of numerous different pumps that are currently known, or that later become known. For example, rather than a positive displacement pump or other type of electrical, electromechanical or mechanical pump, the apparatus may employ a peristaltic pump or a pressure fill, such as where a tank containing the liquid to be filled is pressurized with gas, a valve, such as a timing valve, or a valve in combination with a flow meter and feedback valve control, is coupled between the tank and filling member to meter the amount of liquid that flows through the filling member and into a respective storage chamber.

In addition, the containers may include any desired number of sealed empty chambers, including, for example, a first chamber for receiving one or more first liquid components, and a second chamber for receiving one or more second liquid components. In some such embodiments, the first and second chambers are initially sealed with respect to each other to maintain the first and second liquid components separate from each other during, for example, the shelf life of the product. Then, when the product is ready to be dispensed or used, the container includes a mechanism to allow the first and second chambers to be placed in fluid communication with each other to allow mixing of the first and second liquid components at the time of use, or shortly before use. Exemplary containers that may be used in connection with the methods and apparatus of the present invention include those described in the following patent applications: U.S. Provisional Patent Application Ser. No. 60/983,153, filed Oct. 26, 2007, entitled "Ready to Feed Container with Drinking Dispenser and Sealing Member, and Related Method"; U.S. patent application Ser. No. 11/339,966, filed Jan. 25, 2006, entitled "Container Closure With Overlying Needle Penetrable And Thermally Resealable Portion And Underlying Portion Compatible With Fat Containing Liquid Product, And Related Method"; U.S. patent application Ser. No. 11/786,206, filed on Apr. 10, 2007, entitled "Ready to Drink Container with Nipple and Laser Resealable Portion, and Related Method," which claims priority to similarly-titled U.S. Provisional Patent Application Ser. No. 60/790,684, filed Apr. 10, 2006; U.S. Provisional Patent Application Ser. No. 60/981,107, filed Oct. 11, 2007, entitled "Container Having a Closure and Removable Resealable Stopper for Sealing a Substance Therein and Related Method."

Further, the filling machines of the present invention may take any of numerous different configurations that are currently known, or that later become known for filling containers. For example, the filling machines may have any of numerous different mechanisms for sterilizing, feeding and/or aseptically filling the liquid components into the sealed empty chamber(s) of the containers. In addition, rather than use the penetrable and resealable stopper, the containers may employ filling valves and filling members for filling through the filling valves as disclosed in the following patents and patent applications that are hereby incorporated by reference in their entireties as part of the present disclosure: U.S. application Ser. No. 10/843,902, filed May 12, 2004, titled "Dispenser and Apparatus and Method for Filling a Dispenser", now U.S. Pat. No. 6,997,219, issued Feb. 14, 2006; U.S. application Ser. No. 11/349,873, filed Feb. 8, 2006, titled "Dispenser and Apparatus and Method for Filling a Dispenser"; U.S. application Ser. No. 10/976,349, filed Oct. 28, 2004, titled "Container and Valve Assembly for Storing and Dispensing Substances, and Related Method"; U.S. patent application Ser. No. 11/487,386, filed Jul. 17, 2006, entitled "Container with Valve Assembly for Filling and Dispensing Substances, and Apparatus and Method for Filling," which is a continuation of similarly-titled U.S. patent application Ser. No. 10/833,371, filed Apr. 28, 2004, now U.S. Pat. No. 7,077, 176, claims priority to U.S. Provisional patent Application Nos. 60/471,592, filed May 19, 2003, 60/469,67, filed May 12, 2003, and 60/465,992, filed Apr. 28, 2003.

In such alternative embodiments, a valve is formed or otherwise mounted on the container in fluid communication with the storage chamber to fill the storage chamber therethrough. In addition, the container may include a second valve formed on or otherwise mounted on the container for allowing gas to flow out of the storage chamber during filling thereof, or to allow drawing or evacuation of gas from the storage chamber during filling thereof. The "dome-spring" valve disclosed in the above-mentioned patent and application may allow for venting gas out of the chamber during filling of the chamber therethrough. Still further, the pumps may take the form of any of numerous different pumps that are currently known, or that later become known. For example, rather than a positive displacement pump or other type of electrical, electromechanical or mechanical pump, the apparatus may employ a peristaltic pump or a pressure fill, such as where a tank containing the liquid to be filled is pressurized with gas, a valve, such as a timing valve, or a valve in combination with a flow meter and feedback valve control, is coupled between the tank and filling member to meter the amount of liquid that flows through the filling member and into a respective storage chamber.

If desired, the container closure may be molded in the same mold as the container body, or may be molded in adjacent molding machines, and at least one of the container closure and the body may be assembled within or adjacent to the mold in accordance with the teachings of U.S. patent application Ser. Nos. 11/074,454 and 11/074,513 incorporated by reference above: U.S. Provisional Patent Application Ser. No. 60/727,899 filed Oct. 17, 2005, entitled "Sterile De-Molding Apparatus And Method"; and U.S. patent application Ser. No. 11/582,291, filed Oct. 17, 2006, titled "Sterile De-molding Apparatus and Method", each of which is hereby incorporated by reference in its entirety as part of the present disclosure. One advantage of this approach is that the container is closed to define a sealed, empty sterile chamber at essentially the time of formation, and the container is never opened (through filling, resealing, and during shelf life) until the product is dispensed. Accordingly, a significantly high level of sterility assurance can be achieved. Alternatively, as described above, the sealed empty containers may be sterilized in any of numerous different ways that are currently known, or that later become known, such as by applying radiation, such as beta or gamma radiation, or by applying a fluid sterilant thereto, such as VHP.

The term "sterile" should be understood to mean that the product in question complies with the respective microbiological standard prescribed for products of that type in national and international legislation. For example, the components in embodiments of the present invention can be rendered sterile by techniques which are explicitly designed to reduce or eliminate interactions and heat reactions of proteins and lipids, proteins and carbohydrates and/or to reduce damage to or decomposition of heat labile macro- and micronutrients, such as nucleotides, vitamins, probiotics, long chain polyunsaturated fatty acids, etc. A variety of suitable techniques are available. Some of these techniques rely on the application of heat (i.e., thermally sterilized), for example, such as retorting and aseptic processing. Other non-heat or "cold sterilization" techniques include, for example, bacterial filtration or microfiltration, high pressure sterilization and irradiation. These techniques may be selected and combined as appropriate in the production of specific formulas or products according to the intended use of the formulas or products of the present invention.

As may be recognized by those of ordinary skill in the pertinent art based on the teachings herein, numerous changes may be made to the above-described and other embodiments without departing from the scope of the invention as defined in the appended claims. For example, the apparatus and method may involve the use of any of numerous different types of containers and/or different product formulations, including containers having plural needle penetrable and thermally resealable portions. In addition, the containers need not include a penetrable and thermally resealable portion, but rather may include other means for aseptically filling the sealed empty sterile storage chambers of the containers, such as filling valves, and/or filling valves and venting valves, and that are filled with the associated filling members as described in the above-mentioned co-pending patents and patent applications and incorporated herein. In addition, the term container is used herein to mean any device that includes one or more chambers for receiving the filled liquids, and including without limitations containers with or without valves or other dispensing devices, and/or containers with fixed or variable-volume storage chambers. Accordingly, this detailed description of currently preferred embodiments is to be taken in an illustrative as opposed to a limiting sense.

What is claimed is:

1. An apparatus for formulating and aseptically filling liquid products, comprising:
   a first liquid source including at least one first liquid component;
   a second liquid source including at least one second liquid component;
   a container including a body defining at least one empty, sterile storage chamber therein that is sealed with respect to ambient atmosphere;
   a sterile filling chamber;
   a first filling member coupled in fluid communication with the first liquid source, movable relative to the container located within the sterile filling chamber, and connectable in fluid communication with the sealed, sterile storage chamber of the container for aseptically introducing the at least one first liquid component through the first filling member and into the storage chamber;
   a second filling member coupled in fluid communication with the second liquid source, movable relative to the container located within the sterile filling chamber, and connectable in fluid communication with the sealed, empty sterile storage chamber of the container for aseptically introducing the at least one second liquid component through the second filling member and into the storage chamber and, in turn, combining, within the sterile storage chamber of the container, the at least one first and at least one second liquid components into a liquid formulation hermetically sealed with respect to ambient atmosphere in the storage chamber; and
   a sterilization apparatus that sterilizes, at a cold or about ambient temperature, a heat labile first or second liquid component.

2. An apparatus as defined in claim 1, wherein the container further includes at least one needle penetrable and resealable portion in fluid communication with the storage chamber; and the first filling member comprises a first filling needle coupled in fluid communication with the first liquid source and movable relative to the at least one needle penetrable and resealable portion of the container for aseptically introducing the at least one first liquid component through the first filling needle and into the storage chamber; the second filling member comprises a second filling needle coupled in fluid communication with the second liquid source and movable relative to the at least one needle penetrable and resealable portion of the container for aseptically introducing the at least one second liquid component through the second filling needle and into the storage chamber and, in turn, combining the at least one first and the at least one second liquid components into a liquid formulation; and a radiation or energy source for applying radiation or energy to hermetically seal the liquid formulation within the storage chamber.

3. An apparatus as defined in claim 2, wherein the container includes a plurality of needle penetrable and resealable portions in fluid communication with the at least one storage chamber of the container connectable in fluid communication with a plurality of sources of liquid components for introducing a plurality of different liquid components into the at least one storage chamber.

4. An apparatus as defined in claim 3, wherein the container includes a plurality of storage chambers, and each storage chamber includes at least one needle penetrable and resealable portion in fluid communication therewith.

5. An apparatus as defined in claim 2, wherein the penetrable and resealable portion is thermally resealable, and the radiation or energy source is a laser source connectable in thermal communication with the at least one penetrable and resealable portion.

6. An apparatus as defined in claim 1, wherein the at least one first liquid component is heat labile, the at least one second liquid component is not heat labile, and the apparatus further comprises (i) a filtration sterilization apparatus coupled in fluid communication with the first liquid source for sterilizing the at least one first liquid component by filtration prior to introducing the at least one first liquid component through the first filling member, and (ii) a thermal sterilization apparatus for thermally sterilizing the at least one second liquid component prior to introducing the at least one second liquid component through the second filling member.

7. An apparatus as defined in claim 1, further comprising a first filling station including at least one of the first filling member, and a second filling station including at least one of the second filling member.

8. An apparatus as defined in claim 7, further comprising at least one pump drivingly coupled to the first and second filling members for pumping the components therethrough.

9. An apparatus as defined in claim 8, wherein the at least one pump comprises a first pump drivingly coupled to the first filling member, and a second pump drivingly coupled to the second filling member.

10. An apparatus as defined in claim 7, wherein the container further includes at least one needle penetrable and resealable portion in fluid communication with the storage chamber, and each of the first and second filling stations includes a needle manifold with a plurality of needles defining the respective at least one of the first and second filling members spaced relative to each other and movable relative to a container support for penetrating a plurality of containers mounted on the support, for filling the containers through the needles, and for withdrawing the needles from the filled containers; and a plurality of assemblies, wherein each assembly is connectable to a source of radiation or energy, and is directed substantially onto the needle penetrable and resealable portion of a respective container for applying radiation or energy thereto and resealing a needle hole therein.

11. An apparatus as defined in claim 10, wherein the wherein the penetrable and resealable portion is thermally resealable, and the assembly is a laser assembly connectable to a source of laser radiation, and is focused on the penetration spot for applying laser radiation thereto and thermally resealing the needle hole therein.

12. An apparatus as defined in claim 1, further comprising:
a housing defining an inlet end, an outlet end, and the sterile filling chamber is located between the inlet and outlet ends;
a conveyor located at least partially within the sterile filling chamber and defining a plurality of container positions thereon for supporting and moving containers in a direction from the inlet end toward the outlet end through the sterile filling chamber;
a fluid sterilant station located within the sterile filling chamber and coupled in fluid communication with a source of fluid sterilant for transmitting fluid sterilant onto at least an exposed portion of a respective container supported on the conveyor within the fluid sterilant station and sterilizing the exposed portion of the container; and
at least one sterilant removing station located within the sterile filling chamber between the fluid sterilant station and the outlet end of the housing, and coupled in fluid communication with a source of heated gas for transmitting heated gas onto a container supported on the conveyor within the at least one sterilant removing station to flush away fluid sterilant on the container;
wherein the first and second filling members are located within the sterile filling chamber between the at least one sterilant removing station and the outlet end of the housing for receiving the sterilized containers therefrom.

13. An apparatus as defined in claim 12, wherein the fluid sterilant is hydrogen peroxide.

14. An apparatus as defined in claim 12, further comprising a source of sterile gas coupled in fluid communication with the sterile filling chamber for creating an over pressure of sterile gas within the sterile filling chamber, and means for directing a flow of sterile gas substantially in a direction from the outlet end toward the inlet end of the housing to thereby prevent fluid sterilant from flowing onto containers located adjacent to at least one of the first and second filling members.

15. An apparatus as defined in claim 14, wherein the conveyor includes a plurality of pivotally mounted container supports that engage opposing sides of a respective container supported thereon relative to each other, and substantially isolate a sterile portion of the container located above the container supports relative to a portion of the container located below the container supports to thereby prevent any contamination on the lower portion of the container from contaminating the sterile upper portion of the container.

16. An apparatus as defined in claim 14, wherein the at least one first liquid component is heat labile, the at least one second liquid component is not heat labile, and the apparatus further comprises (i) a filtration sterilization apparatus coupled in fluid communication with the first liquid source for sterilizing the at least one first liquid component by filtration prior to introducing the at least one first liquid component through the first filling member, and (ii) a thermal sterilization apparatus for thermally sterilizing the at least one second liquid component prior to introducing the at least one second liquid component through the second filling member.

17. An apparatus as defined in claim 1, wherein the container includes at least one penetrable and thermally sealable portion that is a thermoplastic elastomer that is heat sealable to hermetically seal at least one penetration aperture therein by applying laser radiation at a predetermined wavelength and power thereto, and defines (i) a predetermined wall thickness, (ii) a predetermined color and opacity that substantially absorbs the laser radiation at the predetermined wavelength and substantially prevents the passage of the radiation through the predetermined wall thickness thereof, and (iii) a predetermined color and opacity that causes the laser radiation at the predetermined wavelength and power to hermetically seal the penetration aperture in a predetermined time period of less than or equal to about 5 seconds and substantially without burning the penetrable portion.

18. An apparatus as defined in claim 1, wherein the container includes at least one penetrable and thermally sealable portion that is a thermoplastic elastomer that is heat sealable to hermetically seal a penetration aperture therein by applying laser radiation at a predetermined wavelength and power thereto, and includes (i) a styrene block copolymer; (ii) an olefin; (iii) a predetermined amount of pigment that allows the penetrable portion to substantially absorb laser radiation at the predetermined wavelength and substantially prevent the passage of radiation through a predetermined wall thickness thereof, and hermetically seal a penetration aperture formed therein in a predetermined time period of less than or equal to about 5 seconds; and (iv) a predetermined amount of lubricant that reduces friction forces at an interface of the first and second filling members and the penetrable portion.

19. An apparatus as defined in claim 1, wherein the container includes at least one penetrable and thermally sealable portion that is a thermoplastic elastomer that is heat sealable to hermetically seal a penetration aperture therein by applying laser radiation at a predetermined wavelength and power thereto, and includes (i) a first polymeric material in an amount within the range of about 80% to about 97% by weight and defining a first elongation; (ii) a second polymeric material in an amount within the range of about 3% to about 20% by weight and defining a second elongation that is less than the first elongation of the first polymeric material; (iii) a pigment in an amount that allows the second material portion to substantially absorb laser radiation at the predetermined wavelength and substantially prevent the passage of radiation through a predetermined wall thickness thereof, and hermetically seal a penetration aperture formed in the penetrable region thereof in a predetermined time period of less than or equal to about 5 seconds; and (iv) a lubricant in an amount that reduces friction forces at an interface of the first and second filling members and the penetrable portion.

20. An apparatus as defined in claim 1, further comprising first sterilization apparatus for sterilizing the at least one first liquid component, and second sterilization apparatus for separately sterilizing the at least one second liquid component.

21. An apparatus as defined in claim 20, wherein the at least one first liquid component is heat labile, the at least one second liquid component is not heat labile, the first means is a filter, and the second means is a thermal sterilization apparatus.

22. An apparatus as defined in claim 20, wherein at least one of the at least one first and the at least one second liquid components is heat labile, and the respective first or second sterilization apparatus does not damage, destroy or decompose the heat labile components.

23. An apparatus as defined in claim 1, wherein the container includes a thermoplastic portion in fluid communication with the chamber, the thermoplastic portion defining a penetrable region that is pierceable with a needle to form an aperture therethrough, and is resealable to hermetically seal the aperture, wherein the thermoplastic portion includes (i) a first polymeric material in a first amount by weight including a styrene block copolymer and defining a first elongation; (ii) a second polymeric material in a second amount by weight that is less then the first amount, including at least one of an ethylene alpha-olefin, a polyolefin, and an olefin, and defining a second elongation that is less than the first elongation; and (iii) a lubricant in an amount that reduces friction forces at an interface of a needle and the thermoplastic portion during penetration thereof.

\* \* \* \* \*

UNITED STATES PATENT AND TRADEMARK OFFICE
CERTIFICATE OF CORRECTION

| | | |
|---|---|---|
| PATENT NO. | : 8,646,243 B2 | Page 1 of 1 |
| APPLICATION NO. | : 12/245678 | |
| DATED | : February 11, 2014 | |
| INVENTOR(S) | : Daniel Py | |

It is certified that error appears in the above-identified patent and that said Letters Patent is hereby corrected as shown below:

In the Claims

At column 23, claim 11, line number 62-63, replace the words "wherein the wherein the" with --wherein the--.

Signed and Sealed this
Seventeenth Day of March, 2015

Michelle K. Lee
*Director of the United States Patent and Trademark Office*